(12) United States Patent
Roy et al.

(10) Patent No.: US 12,335,005 B2
(45) Date of Patent: Jun. 17, 2025

(54) BEAMFORMING FEEDBACK REDUCTION IN WIFI

(71) Applicant: NXP USA, Inc., Austin, TX (US)

(72) Inventors: Sayak Roy, Kolkata (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 32 days.

(21) Appl. No.: 18/512,796

(22) Filed: Nov. 17, 2023

(65) Prior Publication Data

US 2024/0171238 A1 May 23, 2024

(30) Foreign Application Priority Data

Nov. 17, 2022 (IN) .............................. 202221066010

(51) Int. Cl.
| | | |
|---|---|---|
| H04B 7/06 | (2006.01) | |
| H04L 5/00 | (2006.01) | |
| H04W 84/12 | (2009.01) | |

(52) U.S. Cl.
CPC ......... *H04B 7/0617* (2013.01); *H04B 7/0634* (2013.01); *H04L 5/0048* (2013.01); *H04W 84/12* (2013.01)

(58) Field of Classification Search
CPC ... H04B 7/0617; H04B 7/0634; H04L 5/0048; H04W 84/12
See application file for complete search history.

(56) References Cited

U.S. PATENT DOCUMENTS

| | | | | |
|---|---|---|---|---|
| 10,439,693 B2 * | 10/2019 | Tosato | ................ | H04B 7/0626 |
| 11,101,867 B2 * | 8/2021 | Liu | ....................... | H04B 7/0617 |
| 11,929,812 B2 * | 3/2024 | Yang | ................... | H04L 25/0228 |

OTHER PUBLICATIONS

Lee, Wook Bong, et. al; "Feedback Overhead Reduction; Doc.: IEEE 802.11-19/1018r0"; Jul. 2019; 14 pages (11-19-1018-00-00be).

Lim, Chaiman, et al.; "Recent Trend of Multiuser MIMO in LTE-Advanced"; IEEE Communications Magazine; vol. 51, Issue 3; Mar. 2013; pp. 127-135.

Love, David J. et al.; "An Overview of Limited Feedback in Wireless Communication Systems"; IEEE Journal On Selected Areas in Communications; vol. 26, No. 8; Oct. 2008; pp. 1341-1365.

Porat, Ron et al.; "Improved MU-MIMO Performance for Future 802.11 Systems Using Differential Feedback"; 2013 Information Theory and Applications Workshop; Feb. 2013; 5 pages.

Yun, Sunwoong, et al.; "Considerations on feedback overhead; doc.: IEEE 802.11-19/0805r0"; May 13, 2019; 14 pages (11-19-0805-00-00be).

* cited by examiner

*Primary Examiner* — Vineeta S Panwalkar

(57) ABSTRACT

One example discloses a method for beamforming feedback reduction in a WLAN (wireless local area network), including: generating a per-tone beamforming feedback matrix by vectorizing a set of steering vectors using vectorization based dimension reduction (DR-Vec); performing lossy compression on the vectors; reducing the per-tone beamforming feedback matrix to one vector; and generating per-tone beamforming angle information using only the one vector.

18 Claims, 4 Drawing Sheets

BEAMFORMING FEEDBACK REDUCTION IN WIFI

REFERENCE TO FOREIGN APPLICATION TO CLAIM PRIORITY

A priority date for this present U.S. patent application has been established by prior India Patent Application, Serial No. IN202221066010, entitled "Methods Of Beamforming Feedback Reduction In WiFi 8", filed on Nov. 17, 2022, and commonly assigned to NXP USA, Inc.

The present specification relates to systems, methods, apparatuses, devices, articles of manufacture and instructions for wireless local area network (WLAN) systems, and particularly to beamforming feedback reduction in WiFi.

SUMMARY

According to an example embodiment, a method for beamforming feedback reduction in a WLAN (wireless local area network), comprising: receiving, by a beamformee, a sounding packet having a set of feedback tones; deriving a set of channel coefficients from the sounding packet; forming a channel matrix for each tone in the set of feedback tones; computing a singular value decomposition (SVD) on a subset of the feedback tones; deriving a plurality of steering matrices as right singular matrices from the SVD; vectorizing each of the steering matrices into a plurality of vectors; performing a lossy compression on the plurality of vectors to form a lossy compression matrix; and generating a set of per-tone beamforming angle information from the lossy compression matrix.

In another example embodiment, the beamformee is an access point (AP) or a non-AP station (STA).

In another example embodiment, the SVD is performed on each group of feedback tones; and the lossy compression is another SVD performed on the plurality of vectors.

In another example embodiment, the set of feedback tones is k; the channel matrix ($H_k$) is formed for each tone k; the plurality of steering matrices is a matrix VP having steering matrices $V_1, V_2, \ldots, V_p$; the plurality of vectors is $w_1, \ldots, w_p$; and the lossy compression matrix is U.

In another example embodiment, a first r columns of U has an r less than p, and a first r columns of U are indicative of a principal directions of the plurality of vectors $w_1, w_2, \ldots, w_p$.

In another example embodiment, for a group of tones indexed by $1, \ldots, g$, a plurality of vectorized steering matrices wg are obtained; and the plurality of vectorized steering matrices wg are expressed in terms of a base matrix as $wi \approx Usi$, where $si=U^H wi$.

In another example embodiment, $\phi_1, \ldots, \phi_r$ are phase angles of elements on a last row of the U matrix; further comprising, angle-compensating the columns of the U matrix, such that a last row of the U matrix is converted to a real value.

In another example embodiment, angle-compensating includes U'=UP, where $P=diag(e^{-j\phi 1}, \ldots, e^{-j\phi r})$ is a diagonal matrix with the elements $e^{-j\phi 1}, \ldots, e^{-j\phi r}$ on its diagonal.

In another example embodiment, further comprising computing $ri = P^H si = \Sigma e^{-j\phi j}(si)jrj=1$ where $(si)j$ is a jth element of a vector si; wherein $Uri = UP^P H si = Usi$; $wi \approx U'ri$; wherein U' is a base matrix for a group $\{1, \ldots, g\}$, and ri is the coefficient vector for a tone i.

In another example embodiment, further comprising forming a base matrix for each group of g feedback tones and a coefficient matrix for each feedback tone.

In another example embodiment, further comprising forming compressed steering matrices from the base and coefficient matrices.

In another example embodiment, further comprising grouping the set of feedback tones into a plurality of G groups (e.g. $G_1, \ldots, G_G$) of g contiguous feedback tones such that a number of feedback tones is equal to G*g.

In another example embodiment, the subset of feedback tones is a subset of p feedback tones, where $p \leq g$;

In another example embodiment, the right singular matrices are $V_1, V_2, \ldots, V_p$; and vectorizing the steering matrices (i.e. $V_1, V_2, \ldots, V_p$) includes stacking column vectors of the steering matrices.

In another example embodiment, vectorizing the steering matrices is defined as $vec(M)=[m1:mn]$, where $m1, \ldots, mn$ are the column vectors of the matrix M. Let $w_1=vec(V_1), \ldots, w_p=vec(V_p)$; and a plurality of vectors wp are obtained, such that a first vector $w1=vec(V1)$.

In another example embodiment, the vectors (wj) belong to a high-dimensional space; and the high-dimensional space has dimension $NrowNcol \times 1$, where Nrow and Ncol are respectively the number of rows and columns of the steering matrices Vj.

In another example embodiment, performing another SVD on columns of a matrix formed by the plurality of vectors $w_1, \ldots, w_p$ is defined as $[U,\Lambda,T]=svd([w1, w2, \ldots, wp])$; and matrices $U,\Lambda,T$ have dimensions: $(U)(NrowNcol) \times (NrowNcol)$, and $(\Lambda)(NrowNcol) \times p$, $(T)p \times p$.

According to an example embodiment, a method for beamforming feedback reduction in a WLAN (wireless local area network), comprising: generating a per-tone beamforming feedback matrix by vectorizing a set of steering vectors using vectorization based dimension reduction (DR-Vec); performing lossy compression on the vectors; reducing the per-tone beamforming feedback matrix to one vector; and generating per-tone beamforming angle information using only the one vector.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
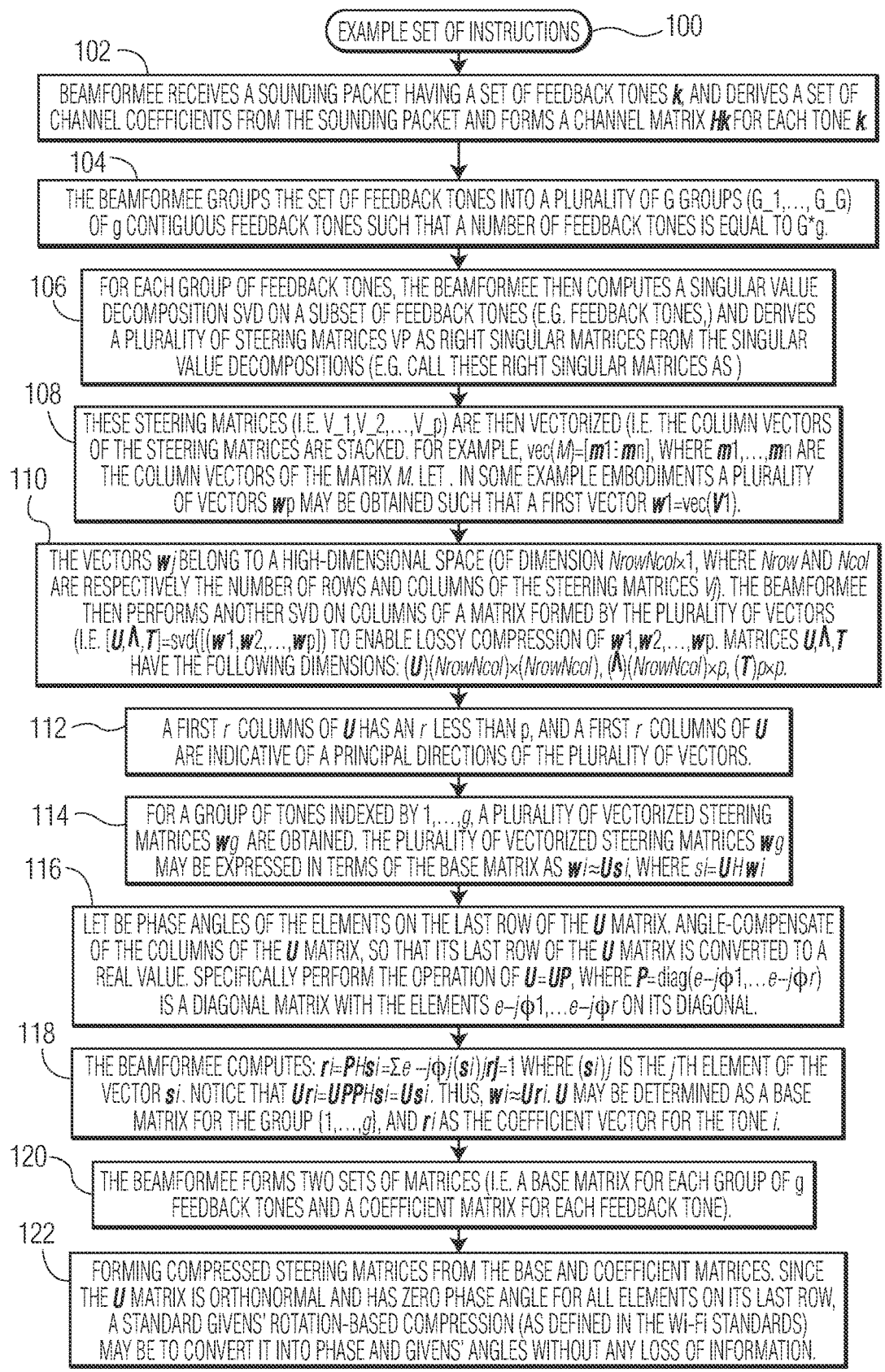
FIG. 1 represents an example set of instructions for beamforming feedback reduction.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Future WLAN (wireless local area network) (e.g. WiFi) standards are likely to use a larger number of antennas, streams and bandwidths. For example, WiFi 8 may mandate support for up to 16 antennas and 16 streams, and up to a 320 MHz bandwidth. Under such large antenna/stream dimensions and large bandwidths, beamforming feedback becomes a concern and can cause significant impact on network throughput.

Current techniques for beamforming feedback size reduction are based on dimension reduction, differential angle feedback, non-uniform quantization etc. For example, several methods have been proposed in the literature based on lossless and lossy techniques. Lossless methods are typically based on source coding while lossy methods are based on dimension reduction. While lossless methods are better in terms of error performance, they don't fare very well in terms of feedback overhead reduction.

Now discussed are lossy compression techniques (i.e. methods) that provide better compression for beamforming feedback reduction while maintaining a same or similar network throughput performance. Lossy compression techniques are performed on the feedback matrices across tones. The feedback matrices are vectorized and thereafter principal directions across tones are found in a high dimensional space which helps to achieve significant compression over existing methods. With these techniques a per-tone information becomes small which helps to achieve to reduce the net feedback size As will be more fully discussed below, these techniques will include vectorizing the steering vectors and performing lossy compression on the high dimensional vectors. Reducing the per-feedback-tone matrix to a vector so as to minimize per-tone information enables sending complete angle information at very small additional cost of only one angle per tone.

These lossy compression techniques make use of redundancy of CSI across tones, includes vectorization of steering matrices and performing SVD of the vectorized steering matrices (in high dimensions) in order to achieve a higher level of compression. As a result, the per-tone information becomes very small (N×1) which results in a feedback overhead reduction. For example, since the per-tone matrices are N×1, the extra information required to send complete angle information is small (only one extra angle per tone).

These beamforming feedback reduction techniques achieve a better balance between basis vectors and per-tone coefficients, which helps to reduce an overall feedback size.

FIG. 1 represents an example set of instructions 100 for enabling beamforming feedback reduction. Note that an order in which the instructions are discussed does not limit the order in which other example embodiments implement the instructions unless otherwise specifically stated. Additionally, in some embodiments the instructions are implemented concurrently.

In 102, for DR-VEC (vectorization-based dimension reduction), a beamformee (e.g. an access point (AP) or a non-AP station (STA)) receives a sounding packet having a set of feedback tones k, and derives a set of channel coefficients from the sounding packet and forms the channel matrix Hk for each tone k.

Next, in 104, the beamformee groups the set of feedback tones into a plurality of G groups $(G_1, \ldots, G_G)$ of g contiguous feedback tones such that a number of feedback tones is equal to G*g.

Then in 106, for each group of feedback tones, the beamformee then computes a singular value decomposition SVD on a subset of feedback tones (e.g. p feedback tones, p≤g) and derives a plurality of steering matrices VP as right singular matrices from the singular value decompositions (e.g. call these right singular matrices as $V_1, V_2, \ldots, V_p$).

In 108, these steering matrices (i.e. $V_1, V_2, \ldots, V_p$) are then vectorized (i.e. the column vectors of the steering matrices are stacked. For example, vec(M)=[m1: mn], where m1, ..., mn are the column vectors of the matrix M. Let $w_1$=vec($V_1$), ..., $w_p$=vec($V_p$). In some example embodiments a plurality of vectors wp may be obtained such that a first vector w1=vec(V1).

In 110, the vectors wj belong to a high-dimensional space (of dimension NrowNcol×1, where Nrow and Ncol are respectively the number of rows and columns of the steering matrices Vj). The beamformee then performs another SVD on columns of a matrix formed by the plurality of vectors $w_1, \ldots, w_p$ (i.e. [U,Λ,T]=svd([w1, w2, ..., wp]) to enable lossy compression of w1, w2, ..., wp. Matrices U,Λ,T have the following dimensions: (U)(NrowNcol)×(NrowNcol), (Λ)(NrowNcol)×p, (T)p×p.

In 112, a first r columns of U has an r less than p, and a first r columns of U are indicative of a principal directions of the plurality of vectors $w_1, w_2, \ldots, w_p$.

In 114, for a group of tones indexed by 1, ..., g, a plurality of vectorized steering matrices wg are obtained. The plurality of vectorized steering matrices wg may be expressed in terms of the base matrix as wi≈Usi, where si=UHwi.

In 116, let $\phi_1, \ldots, \phi_r$ be phase angles of the elements on the last row of the U matrix. Angle-compensate of the columns of the U matrix, so that its last row of the U matrix is converted to a real value. Specifically perform the operation of U'=UP, where P=diag(e−jϕ1, ..., e−jϕr) is a diagonal matrix with the elements e−jϕ1, ..., e−jϕr on its diagonal.

In 118, the beamformee computes: ri=PHsi=Σe−jϕj(si) jrj=1 where (si)j is the jth element of the vector si. Notice that U'ri=UPPHsi=Usi. Thus, wi≈U'ri. U' may be determined as a base matrix for the group {1, ..., g}, and ri as the coefficient vector for the tone i.

In 120, the beamformee forms two sets of matrices (i.e. a base matrix for each group of g feedback tones and a coefficient matrix for each feedback tone).

In 122, forming compressed steering matrices from the base and coefficient matrices. Since the U matrix is orthonormal and has zero phase angle for all elements on its last row, a standard Givens' rotation-based compression (as defined in the Wi-Fi standards) may be to convert it into phase and Givens' angles without any loss of information.

Further, notice that the magnitude of the coefficient vectors can be ignored (since the norm of the vector $w_i$ is a known quantity and can be recovered through normalization at the beamformer). Thus, ri may also be converted into phase and Givens' angles using the standard compression algorithm as defined in the Wi-Fi standards. Also notice that since we are dealing with coefficient vectors and not matrices, sending complete angle information entails sending only one additional angle per tone. Some implementations may take advantage of this fact since the additional overhead for sending complete angle information is minimal.

The instructions 100 above can be augmented or replaced with one or more of the following additional steps, computations, instructions, etc.

In some embodiments one may choose subgroups of frequencies within each of the $\mathbb{G}$ groups of g feedback tones. For example, suppose the $\mathbb{F}$ subgroups (e.g. plurality of subgroups of value "F") corresponding to the group $G_i$ be $F_1^i, \ldots, F_{\mathbb{F}}^i$ respectively each having $f_1^i, \ldots, f_{\mathbb{F}}^i$ feedback tones respectively.

Then accumulate the channel estimates separately over each of these $\mathbb{F}$ subgroups (e.g. over each plurality of subgroups of F): (e.g. for the jth subgroup $F_j^i$ of $G_i$, compute $B_{F_j^i} = \Sigma_{k \in F_j^i} H_k^H H_k$, where $H_k$ is the channel coefficient matrix corresponding to tone k).

Thereafter SVD of $B_{F_j^i}$ is performed and the matrix of right singular vectors of $B_{F_j^i}$ is obtained. Call this $B_{F_j^i}$. Now, each of these $V_{F_j^i}$ matrices are vectorized, e.g. $w_{F_j^i} = \text{vec} (V_{F_j^i})$ and the base matrix $\hat{U}$ is derived from these vectors using the SVD based technique described before. This helps to reduce the complexity of SVD computation on the vectorized steering matrices.

In various embodiments, pick any one or multiple tones from each subgroup $F_j^i$ and use those directly to compute the steering vectors without performing any accumulation. Tone selection for forming the subgroups $F_1^i, \ldots, F_{\mathbb{F}}^i$ happens on the basis of strength of the channel coefficients as determined based on the most dominant singular value or a multiplicity of singular values associated with the channel coefficient matrices corresponding to the tones within the group $G_i$.

For example, one method for such tone selection could be to consider only those tones for which the most dominant singular value crosses a threshold, or it could be based on the best N out of all channel coefficients corresponding to the feedback tones within the group $G_i$.

In various other embodiments, the base matrix may include different streams considered separately. For example, the first set of base vectors may include vectors constructed using only a set of first streams of the steering matrices across tones and a corresponding coefficient vector also including information only from the first stream. The second set of base vectors may be constructed using only the second streams of the steering matrices across tones and the corresponding coefficient matrices include information only from the second stream and so on.

The basis matrix may combine information across multiple band groups. For example, all streams corresponding to all band groups may be stacked. Thus, a larger dimension may be obtained for constructing the basis matrices by stacking across streams as well as tones. A common set of coefficient matrices may be used across all the band groups while reconstructing the steering matrices from the basis matrices and coefficient vectors.

Thus, the basis matrix may comprise of different streams considered separately, e.g. the first set of basis vectors may comprise vectors constructed using only the first streams of the steering matrices across tones and the corresponding coefficient vectors also comprising information only from the first stream. A second set of basis vectors may only be constructed using only the second streams of the steering matrices across tones and the corresponding coefficient matrices comprise information only from the second stream and so on.

The basis matrix may also combine information across multiple band groups. For example, stack all streams from band group 1, followed be all streams corresponding to band group 2 and so on. Thus end up considering even larger dimension vectors for constructing the basis matrices by stacking across streams as well as tones. A common set of coefficient matrices may be used across all the band groups while reconstructing the steering matrices from the basis matrices and coefficient vectors.

Figure 2:
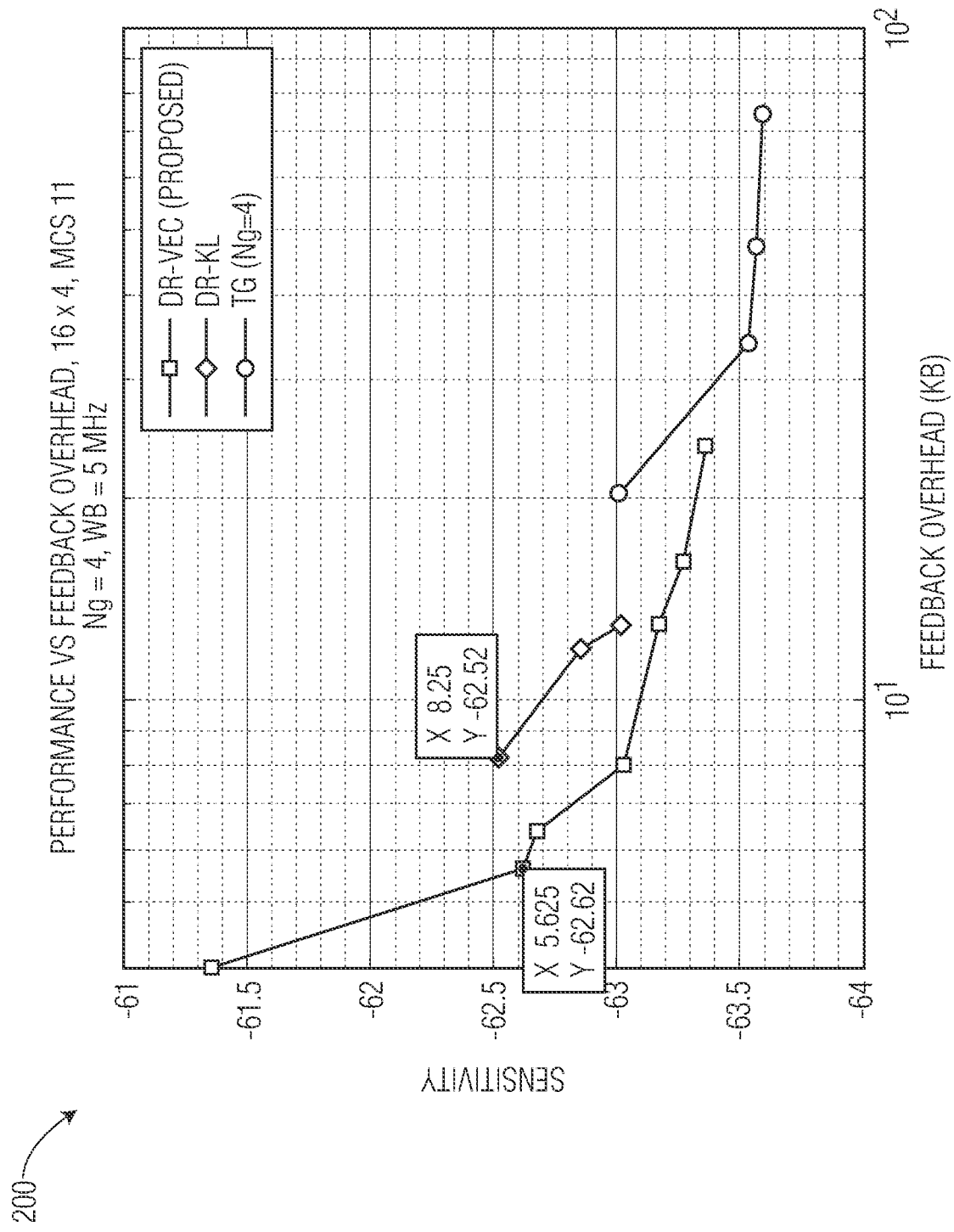
FIG. 2 represents a first example beamforming feedback reduction simulation graph at a first wideband value.

FIG. 2 represents a first example beamforming feedback reduction simulation graph at a first wideband value (WB1). In this first example 200, the first wideband value (WB1) is 5 MHz.

Sensitivity is obtained for different configurations and the non-dominated set (in terms of sensitivity and feedback overhead) is considered for plotting. For DR-VEC (vectorization-based dimension reduction), different choices of "r" and bit-widths for the angles of a base matrix and coefficient matrix are considered. For DR-KL, different choices for "K" that indicate the number of columns of the wide-band matrix and the bit-width of the angles of the wide-band and narrow-band matrices are considered. For TG, NG 4 with different bit-widths for CSM is considered. Sensitivity may be obtained for different configurations and the non-dominated set, in terms of sensitivity and feedback overhead, is considered for plotting.

Figure 3:
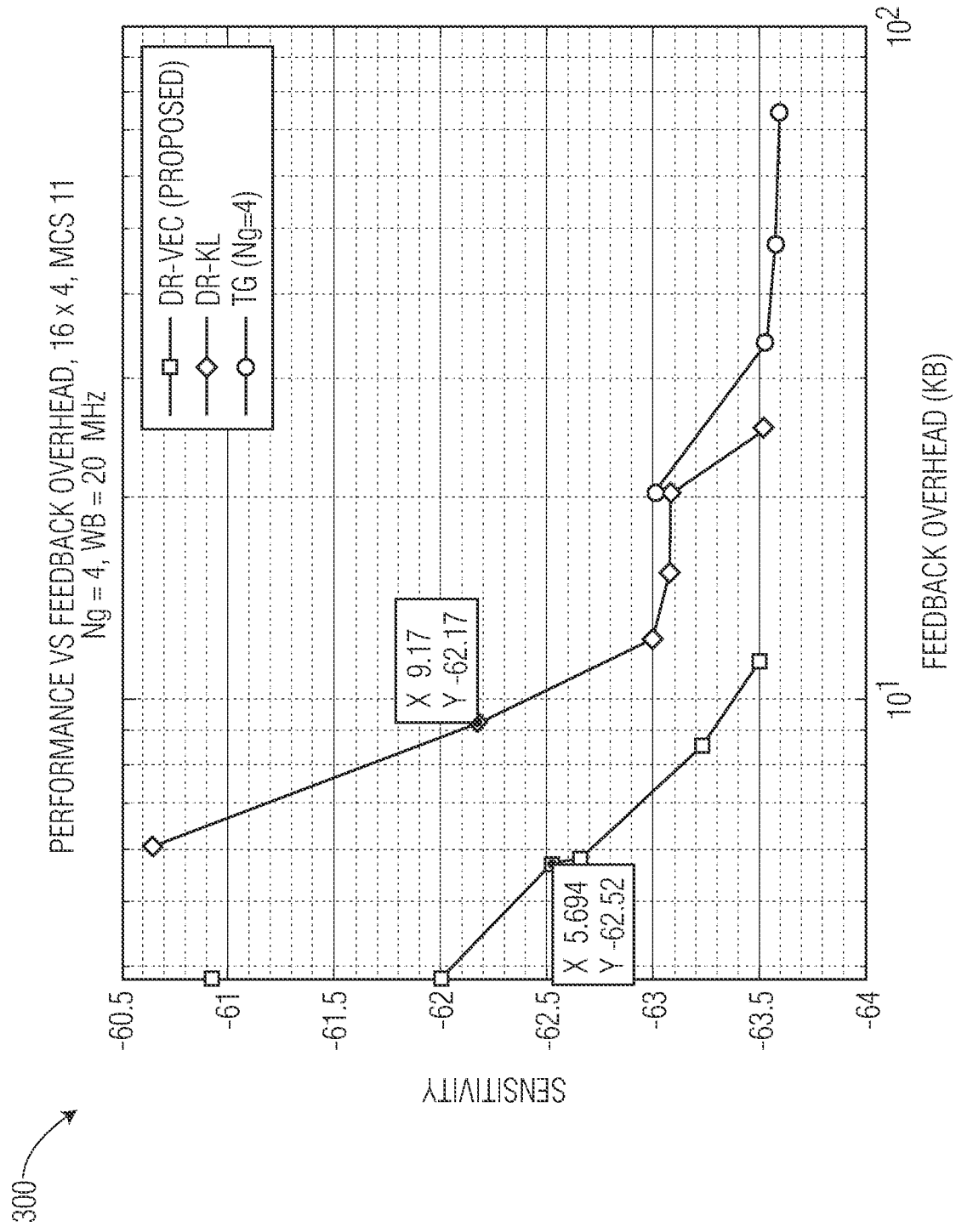
FIG. 3 represents a second example beamforming feedback reduction simulation graph at a second wideband value.

FIG. 3 represents a second example beamforming feedback reduction simulation graph at a second wideband value (WB2). In this second example 300, the second wideband value (WB1) is 20 MHz.

These simulations 200, 300 show that the trade offs between WLAN network performance and beamforming feedback (i.e. overhead) reduction depends upon: (i) vectorization-based dimension reduction (DR-VEC), (ii) dimension reduction based on Karhunen-Loeve decomposition (DR-KL), and (iii) tone grouping technique (TG) based on existing standards.

From these simulations 200, 300, it can be observed that the example 100 method for beamforming feedback reduction (e.g. DR-VEC) can achieve around 32% additional feedback overhead reduction (for 1 dB degradation from ideal performance) over DR-KL scheme for group size g=16 (which corresponds to a bandwidth of 5 MHz), and around 38% additional feedback overhead reduction for g=64 (which corresponds to a bandwidth of 20 MHz). Reductions of 30-38% are possible depending on the parameters used for compression.

Figure 4:
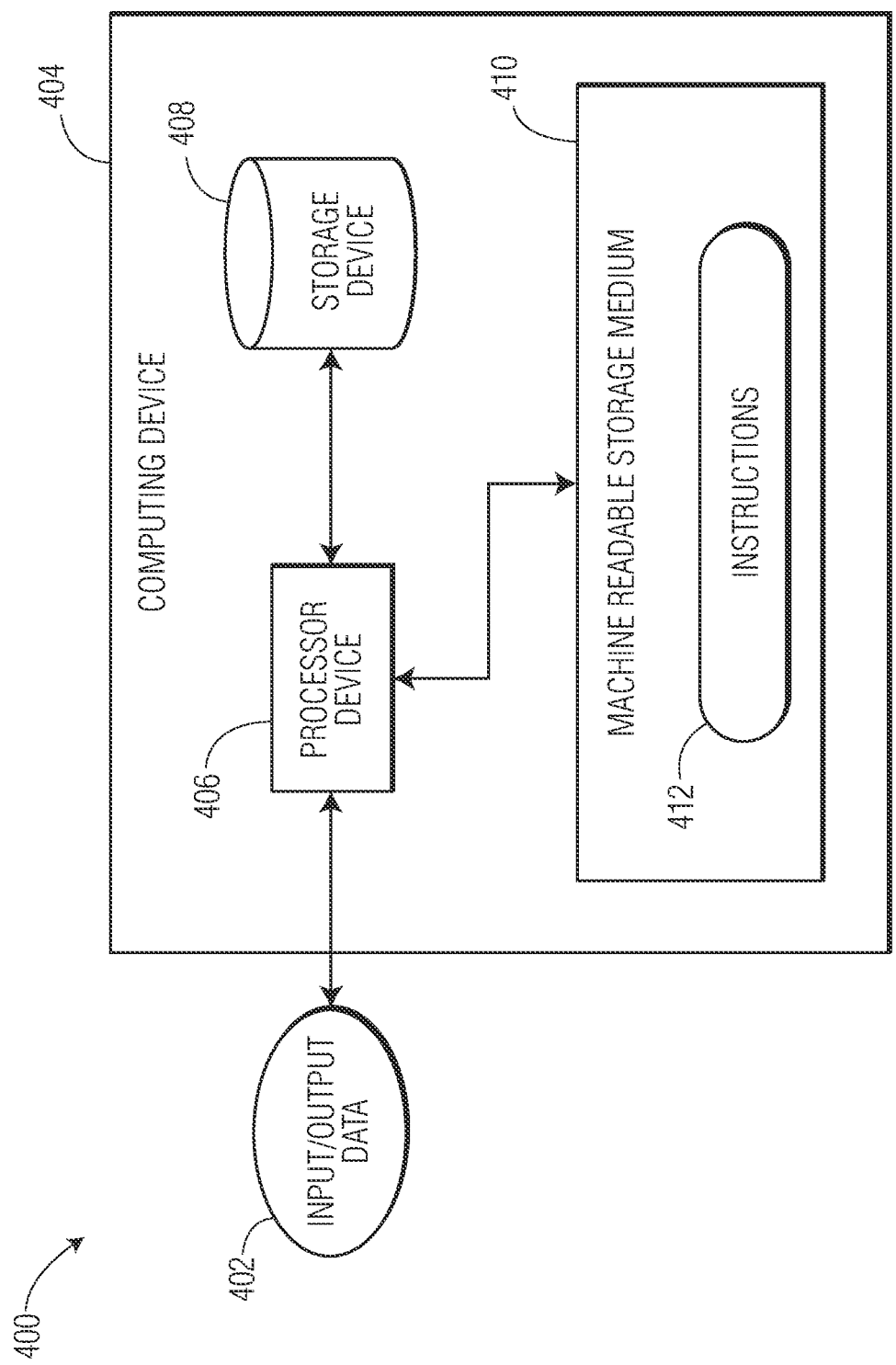
FIG. 4 is example system for hosting the instructions for enabling beamforming feedback reduction.

FIG. 4 is example system 400 for hosting the instructions 100 for enabling beamforming feedback reduction. The system 400 shows an input/output data 402 interface with an electronic apparatus 404. The electronic apparatus 404 includes a processor 406, a storage device 408, and a non-transitory machine-readable storage medium 410. The machine-readable storage medium 410 includes instructions 412 which control how the processor 406 receives input data 402 and transforms the input data into output data 402, using data within the storage device 408. Example instructions 412 stored in the machine-readable storage medium 410 are discussed elsewhere in this specification. The machine-readable storage medium in an alternate example embodiment is a non-transitory computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transitory machine-readable storage medium using a bus and performs operations and tasks that implement one or more instructions stored in the machine-readable storage medium. The machine-readable storage medium in an alternate example embodiment is a computer-readable storage medium.

In some example embodiments the set of instructions 100 described above are implemented as functional and software instructions. In other embodiments, the instructions 100 can be implemented either using logic gates, application specific chips, firmware, as well as other hardware forms.

When the instructions 100 are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A method for beamforming feedback reduction in a WLAN (wireless local area network), comprising:
    receiving, by a beamformee, a sounding packet having a set of feedback tones;
    deriving a set of channel coefficients from the sounding packet;
    forming a channel matrix for each tone in the set of feedback tones;
    computing a singular value decomposition (SVD) on a subset of the feedback tones;
    deriving a plurality of steering matrices as right singular matrices from the SVD;
    vectorizing each of the steering matrices into a plurality of vectors;
    performing a lossy compression on the plurality of vectors to form a lossy compression matrix; and
    generating a set of per-tone beamforming angle information from the lossy compression matrix.

2. The method of claim 1:
    wherein the beamformee is an access point (AP) or a non-AP station (STA).

3. The method of claim 1:
    wherein the SVD is performed on each group of feedback tones; and
    wherein the lossy compression is another SVD performed on the plurality of vectors.

4. The method of claim 1:
    wherein the set of feedback tones is k;
    wherein the channel matrix (Hk) is formed for each tone k;
    wherein the plurality of steering matrices is a matrix VP having steering matrices $V_1, V_2, \ldots, V_p$;
    wherein the plurality of vectors is $w_1, \ldots, w_p$; and
    wherein the lossy compression matrix is U.

5. The method of claim 4:
    wherein a first r columns of U has an r less than p, and a first r columns of U are indicative of a principal directions of the plurality of vectors $w_1, w_2, \ldots, w_p$.

6. The method of claim 4:
    wherein for a group of tones indexed by $1, \ldots, g$, a plurality of vectorized steering matrices wg are obtained; and
    wherein the plurality of vectorized steering matrices wg are expressed in terms of a base matrix as $wi \approx Usi$, where $si = UHwi$.

7. The method of claim 4:
    wherein $\phi_1, \ldots, \phi_r$ are phase angles of elements on a last row of the U matrix;
    further comprising, angle-compensating the columns of the U matrix, such that a last row of the U matrix is converted to a real value.

8. The method of claim 7:
    wherein angle-compensating includes U'=UP, where $P=diag(e-j\phi 1, \ldots, e-j\phi r)$ is a diagonal matrix with the elements $e-j\phi 1, \ldots, e-j\phi r$ on its diagonal.

9. The method of claim 4:
further comprising computing $r_i = P^H s_i = \Sigma e^{-j\phi_j(s_i)} j r_j = 1$ where $(s_i)_j$ is a jth element of a vector $s_i$;
wherein $U' r_i = U P P^H s_i = U s_i$;
wherein $w_i \approx U r_i$;
wherein U' is a base matrix for a group $\{1, \ldots, g\}$; and
wherein $r_i$ is the coefficient vector for a tone i.

10. The method of claim 1:
further comprising forming a base matrix for each group of g feedback tones and a coefficient matrix for each feedback tone.

11. The method of claim 10:
further comprising forming compressed steering matrices from the base and coefficient matrices.

12. The method of claim 4:
further comprising grouping the set of feedback tones into a plurality of G groups (e.g. $G_1, \ldots, G_\mathbb{G}$) of g contiguous feedback tones such that a number of feedback tones is equal to G*g.

13. The method of claim 12:
wherein the subset of feedback tones is a subset of p feedback tones, where $p \leq g$.

14. The method of claim 4:
wherein the right singular matrices are $V_1, V_2, \ldots, V_p$; and
wherein vectorizing the steering matrices (i.e. $V_1, V_2, \ldots, V_p$) includes stacking column vectors of the steering matrices.

15. The method of claim 4:
wherein vectorizing the steering matrices is defined as $vec(M) = [m1: mn]$, where $m1, \ldots, mn$ are the column vectors of the matrix M; let $w_1 = vec(V_1), \ldots, w_p = vec(V_p)$; and
wherein a plurality of vectors wp are obtained, such that a first vector $w1 = vec(V1)$.

16. The method of claim 4:
wherein the vectors $(w_j)$ belong to a high-dimensional space; and
wherein the high-dimensional space has dimension NrowNcol×1, where Nrow and Ncol are respectively the number of rows and columns of the steering matrices $V_j$.

17. The method of claim 4:
wherein performing another SVD on columns of a matrix formed by the plurality of vectors $w_1, \ldots, w_p$ is defined as $[U, \Lambda, T] = svd([w1, w2, \ldots, wp])$; and
wherein matrices $U, \Lambda, T$ have dimensions: (U)(NrowNcol)×(NrowNcol), and ($\Lambda$)(NrowNcol)×p, (T)p×p.

18. A method for beamforming feedback reduction in a WLAN (wireless local area network), comprising:
generating a per-tone beamforming feedback matrix by vectorizing a set of steering vectors using vectorization based dimension reduction (DR-Vec);
performing lossy compression on the vectors;
reducing the per-tone beamforming feedback matrix to one vector; and
generating per-tone beamforming angle information using only the one vector.

* * * * *